Aug. 14, 1962　　　　E. S. JOLINE　　　　3,049,007
FORCE-RATIO MEASURING DEVICE
Filed Dec. 6, 1956　　　　　　　　　　　　2 Sheets-Sheet 1

INVENTOR
EVERETT S. JOLINE
BY
R. J. Craddock
ATTORNEY

Aug. 14, 1962 E. S. JOLINE 3,049,007
FORCE-RATIO MEASURING DEVICE
Filed Dec. 6, 1956 2 Sheets-Sheet 2
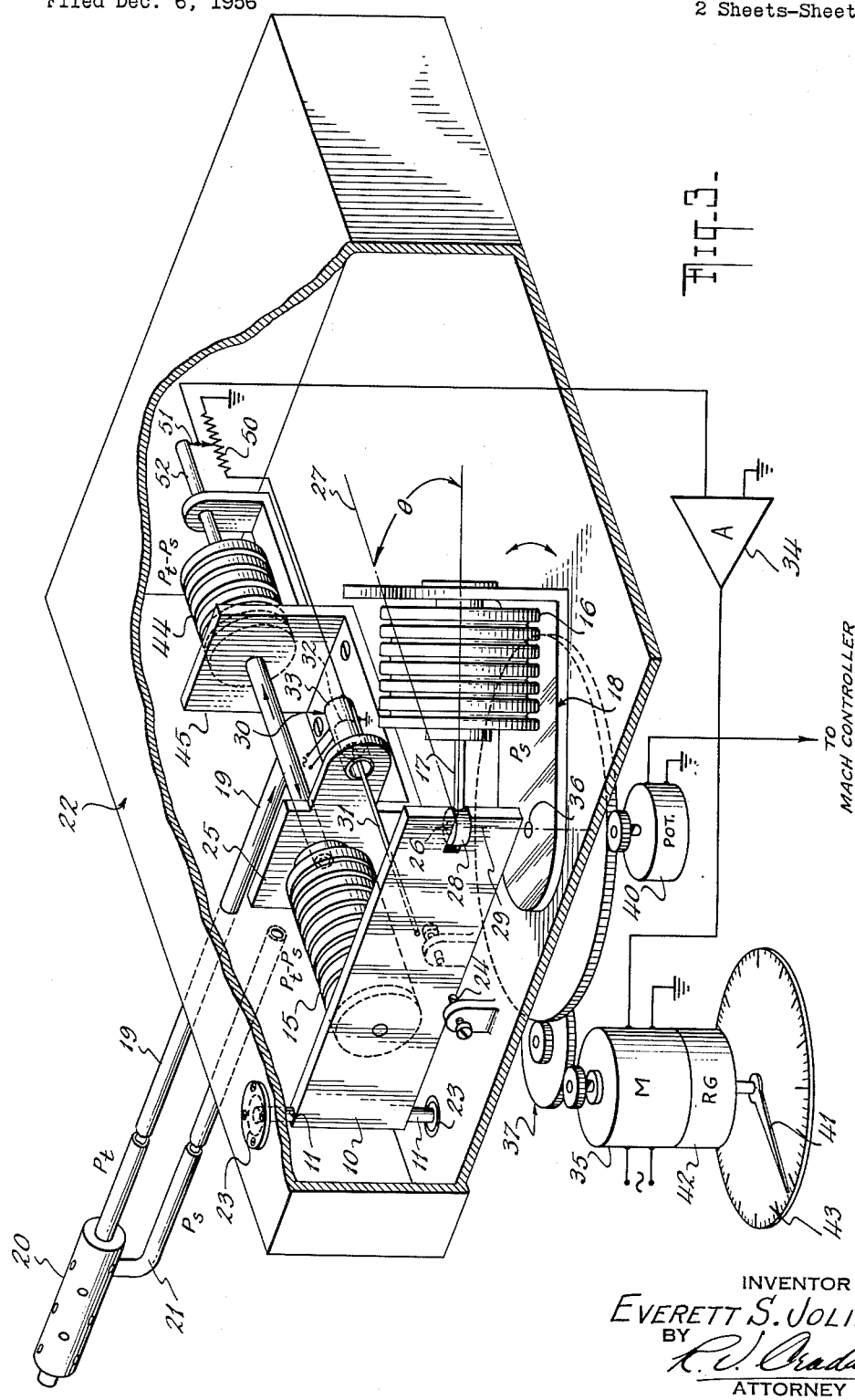
INVENTOR
EVERETT S. JOLINE
BY
ATTORNEY

United States Patent Office 3,049,007
Patented Aug. 14, 1962

3,049,007
FORCE-RATIO MEASURING DEVICE
Everett S. Joline, Huntington Station, N.Y., assignor to Sperry Rand Corporation, a corporation of Delaware
Filed Dec. 6, 1956, Ser. No. 627,723
5 Claims. (Cl. 73—182)

This invention relates to force-ratio measuring and computing devices. More particularly, the invention comprehends the fabrication and use of novel self-contained instruments for simultaneously measuring and comparing a plurality of interdependent variable force ratios and delivering outputs to control or indicating systems as a function of the force-ratios. More particularly, the invention relates to a system for determining and computing Mach number that is compensated for variations due to altitude and flight conditions.

In the prior art methods of measuring and computing force-ratios, the equipment required delicate and expensive means which when subjected to vibration and shock frequently proved unreliable. Variations in flight conditions such as temperature, altitude, and acceleration effects usually generated sufficient errors to make the system unreliable when used in a high performance environment. Particularly, changes in altitude that appreciably reduce the absolute value of the forces caused inaccuracy in the computation in conventional Mach number measuring devices. This is readily appreciated when it is realized that as the altitude of the aircraft is increased, the static air pressure decreases rapidly from 14.7 pounds per square inch at sea level to approximately .403 pound per square inch at 80,000 feet altitude thereby considerably reducing the measured absolute values at the higher altitudes where very accurate response is desirable. A further difficulty of prior art instruments has been due to the complicated linkages that were required and the unequal expansion caused by extreme temperature variations when operated over a wide range of flight conditions. The acceleration effects caused by the relatively high inertia of the sensitive elements of prior art instruments also caused errors that reduced the accuracy of the instrument. Particularly troublesome were the accelerations experienced along the line normal to the fore and aft axis of the aircraft caused by gusts or other disturbances of short duration. Thus, conventional differential pressure devices have proven unsatisfactory for the precise measurement of Mach number, especially when this measure is used to control aircratf flight conditions by means of adjusting fuel intake or when it is desired to maintain the aircraft at a constant Mach number at high altitude.

It is an object, therefore, of the present invention to provide a simple, rugged force-ratio measuring and computing device which provides an accurate measure of the desired force-ratio and which may be uesd as a controller or as an indicator under varying flight conditions.

It is a further object of this invention to provide a simple, economical Mach number measuring and computing system relatively insensitive to force-level variations, vibration and other flight conditions.

Other objects of the invention will be apparent from the following description when taken in connection with the accompanying drawings.

The invention achieves the above and other objects by providing a force-ratio measuring system that is normally maintained in a static equilibrium condition having a balance member or lever pivotally mounted with respect to a fulcrum. Forces are applied to the lever in such a manner that upon unbalance of the lever, a servo system responsive to the position of the lever varies the effectiveness of the force applied to the lever in a manner to rebalance the lever. When the system is again in static equilibrium, a unique function of the force-ratio is determinable by measuring the position of the applied force with respect to a predetermined standard condition. Variations in flight conditions are compensated to provide for optimum system response.

The term signal as used herein is intended to include any measure of any physical characterisitc, said measure may be electrical, mechanical, hydraulic or pneumatic but is not necessarily restricted thereto.

In the drawings, like numerals refer to similar parts throughout the several views, of which FIG. 1 is a schematic diagram of a lever balanced about a fulcrum having forces applied thereto in accordance with the present invention;

FIG. 3 is a perspective view of the invention applied to a Mach number measuring and computing system in which the housing is shown partially broken away.

Figure 1:
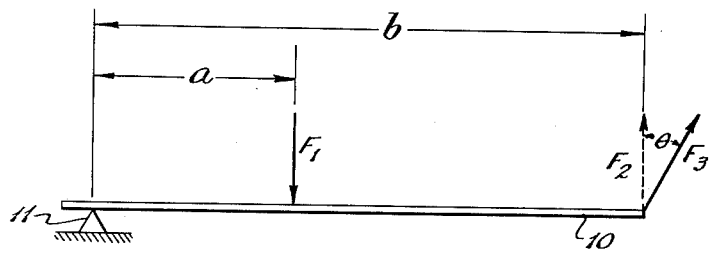

Referring to the schematic diagram of FIG. 1, a balancing beam or lever 10 is positionably mounted on a fulcrum 11. By the application of suitable forces thereto the balancing beam or lever 10 may be held in equilibrium about the fulcrum 11. Assuming the lever 10 to be of negligible mass with force $F_1$ at a predetermined distance $(a)$ from the fulcrum and an opposing force $F_2$ at a predetermined distance $(b)$ from the fulcrum 11, the lever will be maintained in equilibrium in a known manner when $F_1 \cdot a = F_2 \cdot b$. Assuming the lever arms $(a)$ and $(b)$ are fixed at a predetermined distance respectively from the fulcrum 11 then the moment created by the force $F_1$ must be balanced by varying the magnitude of force $F_2$ until the above moments are equal and opposite.

In accordance with the present invention, the force $F_2$ may be varied by rotating the line of action of the force $F_3$ until the component force of $F_3$ that is effective, i.e. force $F_2$, is the desired magnitude. The force $F_2$ is equal to the force $F_3$ multiplied by the cosine of the angle $\theta$ between the position of force $F_3$ and the force $F_2$; the latter being applied perpendicularly with respect to the lever 10. For any particular value of force $F_1$, a particular value of force $F_2$ is required to maintain an equilibrium condition of the lever 10. Since the value of the force $F_2$ is dependent upon the angle, $\theta$, of the force $F_3$ with respect to force $F_2$, by measuring the angle $\theta$; a unique function of the force ratio is determinable. Expressed mathematically this is equivalent to $$F_1 \cdot a = F_3 \cos \theta \cdot b$$

since $$F_2 = F_3 \cos \theta$$

and $$F_1 \cdot a = F_2 \cdot b$$

in the equilibrium condition.

Figure 2:
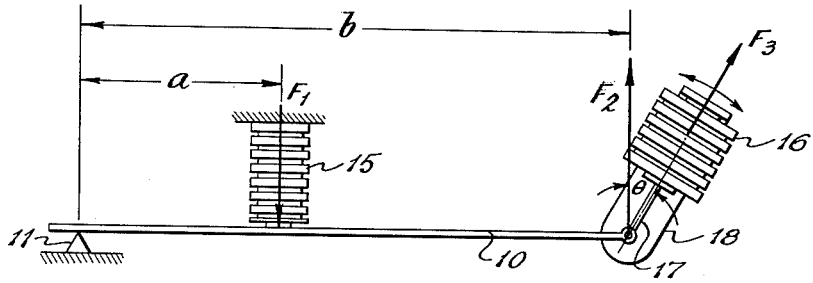
FIG. 2 is a schematic diagram similar to FIG. 1 with the forces applied to the lever by pressure responsive bellows.

Referring now to FIG. 2, the principle of FIG. 1 is shown applied to a pressure responsive device where the pressures are detected by bellows means. The lever 10 is balanced about fulcrum 11 as before. One extremity of a bellows 15 is connected to lever 10 while the other extremity is fixedly mounted by a suitable means. The bellows 15 is thus adapted to provide a force $F_1$ that is applied at a predetermined distance $(a)$ from the fulcrum 11. A bellows 16 is rotatable with respect to the lever 10 and has one extremity pivotally coupled through a shaft 17 or other suitable device to the lever 10 at a predetermined distance $(b)$ from fulcrum 11. The other extremity of the bellows 16 is fixed with respect to a rotatable platform or other suitable positionable mounting means 18. The bellows 16 is thus adapted to provide a force $F_3$ to the lever 10.

When the lever 10 is in equilibrium position both the bellows 15 and 16 are at their free length and the only forces they exert are due to pressure times area (not deflection times spring constant). During transient conditions when a lever deflection may exist the position of the lever is determined by the unbalance in pressure-forces and the combined effective spring constants of the two bellows 15 and 16. These spring constants therefore determine the error sensitivity and gain of the loop to be described below but have no effect on steady state performance and accuracy. The force $F_3$ is applied at a point which is a predetermined distance $(b)$ from the fulcrum 11. By suitable means not shown, the bellows 16 is rotatably positionable such that a component of the force $F_3$, i.e., force $F_2$, applied by the bellows 16 may be adjusted in magnitude as previously described in relation to FIG. 1. The angle $\theta$ is the angle between the longitudinal axis of the bellows 16 along which force $F_3$ is applied and the line that is perpendicular to the lever 10 along which force $F_2$ is effective. The measurement of the angle $\theta$ thus determines a unique function of the pressure or force-ratio when the lever 10 is maintained in an equilibrium condition.

By varying the sources of the pressure within either bellows in a known manner, such as applying a particular pressure to one bellows and evacuating the other bellows, various combinations of pressure or force ratios may be established. By a suitable combination of the force-ratios, various characteristics, particularly of aircraft flight condition, may be determined by measuring the position of bellows 16 relative to a predetermined standard, such as a normal, to obtain $\theta$. This arrangement, for example, is particularly adaptable to the computation of Mach number, true air speed, and other pertinent flight conditions including engine pressure ratios.

Mathematically, when using bellows, the relationship may be expressed as:

$$P_1 \cdot A_1 \cdot a = P_3 \cdot A_3 \cdot b \cos \theta$$

when lever 10 is in an equilibrium condition, where:

$A_1$=the area of bellows 15
$A_3$=the area of bellows 16
$P_1$=pressure applied to bellows 15
$P_3$=pressure applied to bellows 16
$\theta$=angle between a normal to the lever 10 and the position of bellows 16, and assuming $A_1$, $A_3$, $a$ and $b$ are constants, then calling R the constant of the combination, let $$R = \frac{A_1 \cdot a}{A_3 \cdot b}$$

substituting $$\frac{P_1}{P_3} = \frac{\cos \theta}{R}$$

or $$\cos \theta = R \frac{P_1}{P_3}$$

Referring now to FIG. 3, the present invention will be described, by way of example, as applied to a Mach number determining and computing system. A Pitot tube or other suitable device 20 is shown supplying static pressure through a conduit 21 to the interior of a sealed housing or chamber 22. Mounted within the sealed housing 22 is a lever 10 pivotally supported on fulcrum 11 by a suitable means such as ball bearings 23. The movement of the lever 10 is restrained from excessive travel by adjustable stop members 24. One extremity of bellows 15 is fixedly connected to lever 10 at a predetermined distance $(a)$ from fulcrum 11. The other extremity of bellows 15 is connected to a support 25 that is fixed to the housing 22. The lever 10 is thus responsive to the movement of the bellows 15.

The lever 10 is also responsive to the movement of bellows 16 which has one extremity positionably coupled thereto at a predetermined distance $(b)$ from fulcrum 11. The aforesaid extremity of the bellows 16 may be pivotally coupled to the lever 10 directly or may be coupled through a rod or suitable means 17 to the lever by ball bearings or other known devices 26 as indicated. A rotatably positionable platform or mounting bracket 18 supports the other extremity of bellows 16. Preferably, the longitudinal axes of the lever 10, bellows 15 and bellows 16 are substantially coplanar. Also lying in the plane thus determined is a line or normal 27 that is substantially perpendicular to the longitudinal axis of the lever 10 at the point of intersection 28 of the longitudinal axes of the lever 10 and the bellows 16. The bellows 16 is adapted for rotation about the axis of intersection 28 substantially in the above mentioned plane such that the position of the bellows 16 is determinable with respect to the normal 27 in a manner to be described later. In the preferred embodiment shown, the center of rotation of the platform 18 is aligned with the equilibrium position of the axis of intersection 28 along line 29 in such a manner that the position of the platform 18 is determinable with respect to a plane defined by normal 27 and line 29 to be more fully described later.

A suitable signal generating means or pick-off 30 is responsive to the position of the lever 10 with respect to the housing 22. The pick-off 30 may be mounted directly on the lever 10 or on a member coupled to the lever. In the form shown, one extremity of a rod 31 is connected to the lever 10 at a point suitably displaced from the fulcrum 11 to provide a signal in accordance with the movement of the lever. Connected to the other extremity of the rod 31 is a movable armature member 32 that is cooperative with a stator element 33 that forms the electrical pick-off 30, said stator element 33 being fixed relative to the housing 22. The function of the pick-off 30 is to provide an electrical signal proportional to the magnitude of the displacement of the lever 10 from a neutral position; the phase of which may be indicative of the direction of movement from the neutral position, such as an E-type transformer pick-off or other suitable transducer.

The pick-off 30 is connected through potentiometer 50 to an amplifier 34 such that the amplifier 34 is responsive to the signal generated by the signal generating means or pick-off 30. The function of potentiometer 50 will be fully explained later. Connected to the amplifier 34 is a suitable servomotor 35 responsive to the amplifier output. The servomotor 35 is operatively coupled by shaft 36 to the platform 18 on which bellows 16 is supported such that the platform is rotatably positionable in accordance with the servomotor output. In certain embodiments, it may be desirable to provide a power transmission means such as reduction gearing 37 between the servomotor 35 and the rotatable platform 18. Coupled to the platform 18 or motor 35 is a suitable signal generating means such as a potentiometer of pick-off 40 responsive to the position of the bellows 16 which provides an electrical signal in accordance with the position of said rotatable bellows 16 with respect to the normal 27. In the preferred embodiment of the invention shown herewith, an indicating means such as pointer 41 is positioned by the platform 18 or motor 35, the latter through reduction gearing 42, if necessary. Pointer 41 is cooperable with a suitable scale 43 for indicating the position of the rotatable bellows 16 with respect to the normal 27. The position of the bellows 16 with respect to the normal 27, i.e., $\theta$, is proportional to a unique function of the fore-ratio when the system is in an equilibrium condition as explained previously. By applying various combinations of pressures to the interior and exterior of the bellows 15 and 16, a multiplicity of flight conditions may be computed or determined in accordance with the angular position of said rotatable belolws 16.

The system of FIG. 3 may be adapted to a Mach determining and computing device by applying the combination of pressures to be described. A pitot tube 20 supplies total pressure through a conduit 19 to the interior of bellows 15. Since bellows 15 is mounted within housing 22 that is itself supplied with static pressure, as explained previously, the bellows 15 will be responsive to the difference between the total pressure and the static pressure, and apply a force proportional thereto to the lever 10. The force applied by bellows 15 to lever 10 will be dependent upon the aforesaid pressure differential and the area of the bellows, i.e., $A_1$.

By maintaining the interior of the bellows 16 evacuated and also mounting bellows 16 within the housing 22, the bellows 16 will be responsive to the static pressure therein and thus provide a force to the lever 10 in accordance therewith depending upon the area of the bellows 16, i.e., $A_3$. The effective force or moment about the fulcrum 11 due to the bellows 16 is dependent upon the force applied by the bellows 16 multiplied by the cosine of the angle of the bellows 16 with respect to the normal 27, i.e., $\theta$, as explained previously.

A third bellows 44 may be mounted within the housing 22 such that one extremity thereof is connected to a support 45 that is fixed with respect to the housing. The other extremity of the bellows 44 is coupled to the wiper arm 51 of a suitable signal transmission controlling means such as a potentiometer 50 by coupling means or rod 52 such that the movement of the arm 51 is responsive to the movement of the bellows 44. The wiper arm 51 is connected to the amplifier 34 to provide a compensating signal to the amplifier in accordance with the position of bellows 44 to vary the input to the amplifier and thus compensate for variations in force-ratio due to variation of altitude and flight conditions which will be more fully described later.

In one embodiment of the present invention, the interior of bellows 44 is also supplied with total pressure via conduit 19 in the manner that bellows 15 is supplied. By being mounted within the housing 22, the exterior of the bellows 44 is subjected to the ambient static pressure via conduit 21. The movement of wiper arm 51 is thus responsive to the difference between the total and static pressures.

The operation of the system of FIG. 3 will now be described with reference to the preferred embodiment shown herein wherein the force-ratio combination is established to determine and compute Mach number. The structure of the present invention may be adapted to subsonic as well as supersonic measurement of Mach number. A well known expression for Mach number for subsonic conditions is as follows:

$$M^2 = \frac{2}{k-1}\left[\left(\frac{P_t - P_s}{P_s} + 1\right)^{\frac{k-1}{k}} - 1\right]$$

where $M$ = Mach number
$k$ = ratio of specific heat of air at constant pressure to the specific heat of air at constant volume
$P_t$ = total pressure
$P_s$ = static pressure Since $k$ is substantially constant over the range of application, it is seen that the only variable of the above expression is the term $$\frac{P_t - P_s}{P_s} \text{ and Mach number} = f\frac{P_t - P_s}{P_s}$$

It will be noted that the Mach computer of FIG. 3 is a mechanical analogy of the above expression, i.e., bellows 15 provides a function that is proportional to $P_t - P_s$ to the lever 10, and bellows 16 provides a function that is proportional to $P_s$ to the lever 10.

By Rayleigh's supersonic Pitot static formula, the expression for Mach number for supersonic conditions is as follows:

$$\frac{P_t}{P_s} = \left(\frac{k+1}{2}M^2\right)^{\frac{k}{k-1}} \bigg/ \left(\frac{2k}{k+1}M^2 - \frac{k-1}{k+1}\right)^{\frac{1}{k-1}}$$

Referring back to the relationship previously established where $$\cos\theta = R\frac{P_1}{P_3} = R\left(\frac{P_t - P_s}{P_s}\right)$$

then $$\cos\theta = R\left(\frac{P_t}{P_s} - 1\right)$$

and $$\frac{P_t}{P_s} = \frac{\cos\theta}{R} + 1$$

then substituting $$\theta = \text{arc cosine } R\left[\frac{\left(\frac{k+1}{2}M^2\right)^{\frac{k}{k-1}}}{\left(\frac{2k}{k+1}M^2 - \frac{k-1}{k+1}\right)^{\frac{1}{k-1}}} - 1\right]$$

Therefore, by additional substitution, it may be proven that $$M = f\left(\frac{P_t}{P_s}\right) = f\left(\frac{P_t - P_s}{P_s}\right) = f(\cos\theta) = f(\theta)$$

Thus, by maintaining the system in an equilibrium condition with the momens equal about the fulcrum 11 thereby balancing the lever 10, the angular position of the bellows 16 as measured from the normal 27, i.e., $\theta$, is a unique function of Mach number.

Continuing to refer to FIG. 3, the operation of the Mach number computing system is as follows: the bellows 15 produces a differential pressure proportional to the difference between total pressure and static pressure and applies a force in accordance therewith to the lever 10. Due to the application of this force, the lever 10 is moved to a new position that is sensed by pick-off 30. The pick-off 30 provides a signal to the amplifier 34 through potentiometer 50 proportional to the distance and direction of movement of the lever 10. The servomotor 35 is responsive to the amplifier output and rotatably positions the platform 18 on which bellows 16 is mounted, in a direction to return the lever 10 to equilibrium. The lever 10 is maintained in an equilibrium condition when the component of the force applied by bellows 16 in a direction perpendicular to the beam, i.e., $F_3 \cos\theta$, multiplied by its moment arm $(b)$ is equal and opposite to the force, $F_1$, applied by bellows 15 multiplied by its moment arm $(a)$ about the fulcrum 11. The position at which bellows 16 and platform 18 come to rest, i.e., $\theta$, can then be measured by a potentiometer 40 responsive to the position of the belows 16; the output of which will be a function of Mach number. It will be recognized by those skilled in the art that any function of the force-ratio or of Mach number, determined by $\theta$, can be achieved by suitably winding the potentiometer 40 to obtain the particular function desired. For example, since the relation between Mach number and $\theta$ is not linear, a tapered potentiometer may be utilized to obtain an output voltage which is linearly proportional to Mach number. Also coupled to the rotatable bellows 16 or motor 35 such that it is responsive to the movement thereof may be a pointer 41 that cooperates with an indicating scale 43 which is suitably calibrated to indicate the desired function, for example, Mach number.

Due to the variations in flight conditions, particularly altitude and air speed, the variation in the pressure differential to be detected at high altitudes is much smaller for a given change in the ratio of the pressures than at lower altitudes. This condition is aggravated when endeavoring to sense relatively low air speeds at high altitudes, and a considerable relative loss of response may result. Under certain conditions, therefore, to preserve adequate response of the servo system, it may be desirable to maintain the gain of the system substantially constant for all flight conditions. To achieve this purpose a means for computing and compensating for any variations in the absolute value of the forces due to variations of altitude and flight conditions may be incorporated into the system.

In the preferred embodiment shown herein, this is accomplished by the use of a third bellows 44 mounted within housing 22 that cooperates with potentiometer 50. By positioning the wiper arm 51 in accordance with the pressure differential of total minus static pressure as previously explained, the signal from pick-off 30 is compensated as the inverse function of the differential pressure thereby maintaining system gain substantially constant over a wide variation of flight conditions. For example, with increasing altitude, and thus decreasing pressure differential, the bellows 44 will contract thereby positioning wiper arm 51 to allow a greater proportion of the signal applied to potentiometer 50 to be conducted through arm 51 to amplifier 34.

With certain structural changes, the gain may be compensated in other ways. For example, by mounting a pick-off within the housing 22 similar to pick-off 30 such that the former pick-off is responsive to the movement of bellows 44, a signal may be generated proportional to the pressure differential. This signal may be applied, for example, as a cathode bias to one of the amplifier tubes in amplifier 34 in a well known manner in order to adjust the gain thereof to compensate for varying altitude and flight conditions in order to maintain a substantially constant system gain. In such case, the signal from the pick-off 30 might be applied, for example, to the grid of the same tube to adjust the grid bias in accordance with the signal therefrom. The signal form the pick-off from bellows 44 could compensate as an inverse function of the decreasing force-ratio, for example. The same result might also be obtained by applying the signal from the pick-off coupled to bellows 44 to a potentiometer in the feedback circuit from the plate of the first stage of amplifier 34 to the input thereof.

Figure 4:
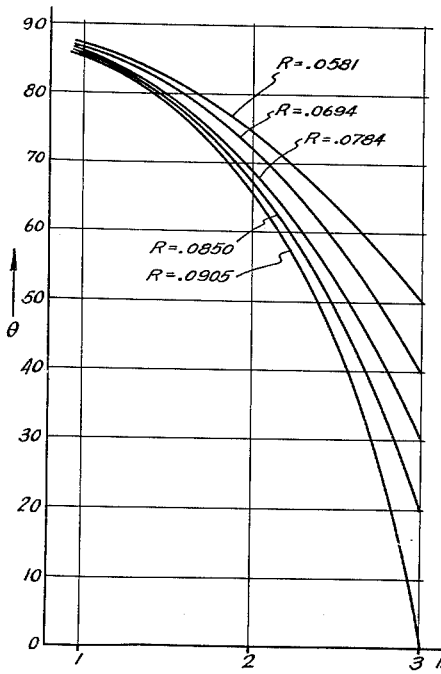
FIG. 4 is a graph showing the relationship between $\theta$ and Mach number for various values of R.

It is further desirable to design the system on the basis of the constant R in accordance with the expected range of operation of the system to achieve optimum performance. Referring to FIG. 4, various values of R have been plotted to show the relationship beween R, $\theta$ and Mach number upon the following equation:

$$\theta = \text{arc cosine } R\left[\frac{\left(\frac{k+1}{2}M^2\right)^{\frac{k}{k-1}}}{\left(\frac{2k}{k+1}M^2-\frac{k-1}{k+1}\right)^{\frac{1}{k-1}}}-1\right]$$

From this chart it can be seen that for an expected range of operation that includes Mach number values from 1 to 3, an R factor of approximately .0784 would be suitable in order to achieve optimum sensitivity over the entire range. For a different range of Mach operation, it might be advantageous to select a function of R having a more desirable slope in the particular range under consideration.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A force-ratio measuring device comprising a lever, a fulcrum therefor, a first force applying means including means responsive to the difference between total pressure and static pressure for applying a force proportional to said differential pressure to said lever, second force applying means including means responsive to static pressure for applying a force proportional to said static pressure to said lever, means responsive to the position of said lever for varying the effectiveness of said second force applying means, additional means responsive to the difference between total pressure and static pressure for providing movement thereof in accordance with this difference, and means responsive to said movement for compensating for variations in the force ratio due to variations of altitude and air speed whereby said device establishes a force-ratio when said lever is maintained in a predetermined position.

2. A force-ratio measuring system, comprising a housing, a source of static pressure connected to the interior of said housing, a lever pivotally mounted within said housing, a fulcrum for said lever, a source of total pressure, a first bellows mounted in said housing adapted to receive said total pressure and coupled to said lever for applying a force thereto in accordance with the difference between the total pressure and the static pressure, a second evacuated bellows mounted in said housing responsive to said static pressure and rotatably coupled to said lever for applying a force thereto in accordance with said static pressure tending to return said lever to equilibrium, a first pick-off responsive to the position of said lever providing a signal in accordance therewith, an amplifier responsive to said first pick-off signal, a servomotor responsive to the amplifier output for rotating said second bellows to vary the effectiveness of the force applied by said second bellows to return said lever to equilibrium, a second pick-off operatively coupled to said second bellows for providing a signal in accordance with the angular position of said second bellows which is representative of a predetermined force-ratio, additional means responsive to the difference between total pressure and static pressure for providing a signal in accordance therewith, and means responsive to said last mentioned signal for compensating said first pick-off signal for undesired variations due to variations of altitude and air speed.

3. A force-ratio measuring system, comprising a housing, a source of static pressure connected to the interior of said housing, a lever pivotally mounted within said housing, a fulcrum for said lever, a source of total pressure, a first bellows mounted in said housing adapted to receive said total pressure and coupled to said lever for applying a force thereto in accordance with the difference between the total pressure and the static pressure, a second evacuated bellows mounted in said housing responsive to said static pressure and rotatably coupled to said lever for applying a force thereto in accordance with said static pressure tending to return said lever to equilibrium, a first pick-off responsive to the position of said lever providing a signal in accordance therewith, an amplifier responsive to said first pick-off signal, a servomotor responsive to the amplifier output for rotating said second bellows to vary the effectiveness of the force applied by said second bellows to return said lever to equilibrium, a second pick-off operatively coupled to said second bellows for providing a signal in accordance with the angular position of said second bellows which is representative of a predetermined force-ratio, indicating means operatively coupled to said second bellows responsive to the angular position of said second bellows for indicating a function of said force ratio in accordance with said angular position of said second bellows, a third bellows mounted in said housing responsive to the difference between the total pressure and the static pressure for providing an output in accordance therewith, and means responsive to the output of said third bellows for compensating said first pick-off signal for undesired variations in sensitivity due to variations of altitude and air speed.

4. A system for determining Mach number with substantially equal sensitivity throughout a wide range of altitude and air speed comprising a housing, a source of static pressure admitted thereto, a lever pivotally mounted thereon, a fulcrum therefor, a source of total pressure, a first bellows mounted in said housing for applying a force to said lever proportional to the difference between the total pressure and the static pressure, a second bellows mounted in said housing for applying a force to said lever proportional to a function of said static pressure, a first pick-off responsive to the position of said lever providing a first signal in accordance with the magnitude and direction of displacement of said lever, an amplifier responsive to said first pick-off signal, a servomotor responsive to the amplifier output for rotating said second bellows whereby the effectiveness of the force applied by said second bellows is varied to return said lever to equilibrium, a second pick-off responsive to the angular position of said second bellows providing a second signal in accordance with the angular position of said second bellows which is a function of Mach number, a third bellows mounted in said housing responsive to the difference between the total pressure and the static pressure and a signal transmission control means connected to receive said first signal and responsive to the position of said third bellows for compensating said first signal whereby the sensitivity of the signal into said amplifier is varied to compensate for variations in altitude and air speed.

5. A system as recited in claim 4 including an indicating means operatively coupled to said second bellows responsive to the angular position of said second bellows for indicating a function of Mach number depending upon the position of said second bellows in the equilibrium condition of said system.

References Cited in the file of this patent
UNITED STATES PATENTS

| | | |
|---|---|---|
| 1,041,432 | Cole | Oct. 15, 1912 |
| 1,174,241 | Earl | Mar. 7, 1916 |
| 1,638,101 | Roucka | Aug. 9, 1927 |
| 1,653,438 | Mc Lean | Dec. 20, 1927 |
| 2,340,008 | Matuszak | Jan. 25, 1944 |
| 2,357,199 | Holst | Aug. 29, 1944 |
| 2,450,884 | Dawson | Oct. 12, 1948 |
| 2,549,624 | Moore | Apr. 17, 1951 |
| 2,606,444 | Brown et al. | Aug. 12, 1952 |
| 2,652,813 | Reuter et al. | Sept. 22, 1953 |
| 2,699,066 | Russell | Jan. 11, 1955 |
| 2,761,317 | Seagrave | Sept. 4, 1956 |

OTHER REFERENCES

Norman F. Smith: "NACA Mach Number Indicator for Use in High-Speed Tunnels," NACA Wartime Report L-423. Originally issued July 1943 as Advanced Confidential Report 3G31 and declassified May 1947, 6 pp. spec. and 2 pp. drwg. Copy available in Div. 36, U.S. Patent Office, 73-182.